April 7, 1942.    M. KLEIN ET AL    2,278,520
ILLUMINABLE PANEL, DIAL AND POINTER STRUCTURE
Filed Nov. 29, 1938    2 Sheets-Sheet 1
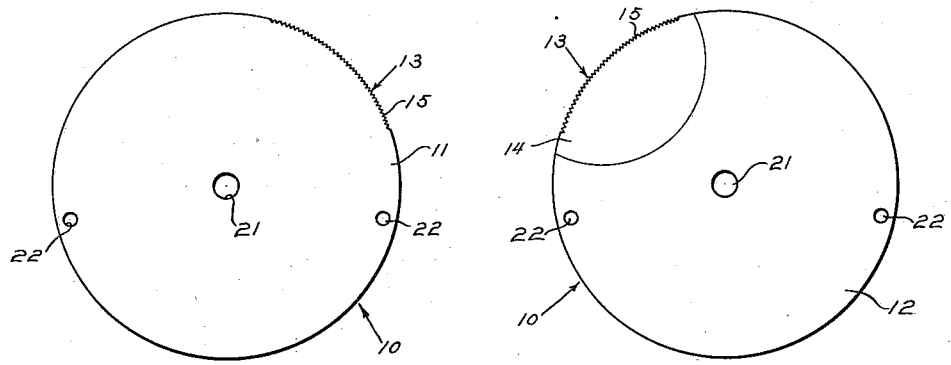
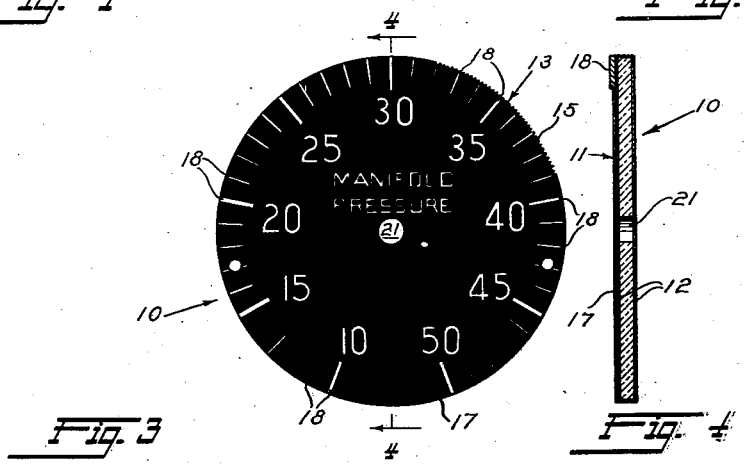
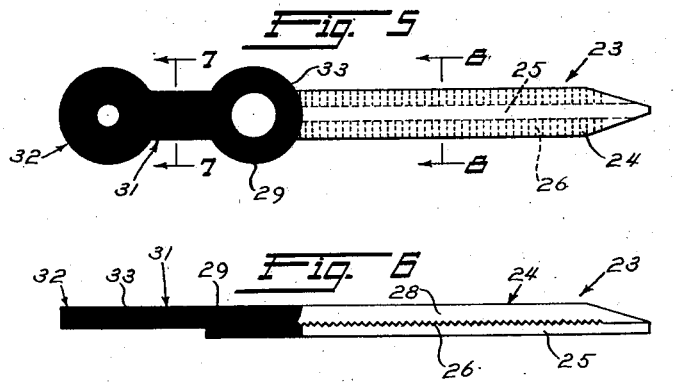
Inventors
Maximilian Klein
William E. Pfeffer
Strauch & Hoffman
Attorneys April 7, 1942. M. KLEIN ET AL 2,278,520
ILLUMINABLE PANEL, DIAL AND POINTER STRUCTURE
Filed Nov. 29, 1938 2 Sheets-Sheet 2

Inventors
Maximilian Klein
William E. Pfeffer

By Strauch & Hoffman
Attorneys

Patented Apr. 7, 1942

2,278,520

UNITED STATES PATENT OFFICE 2,278,520

ILLUMINABLE PANEL, DIAL, AND POINTER STRUCTURE

Maximilian Klein, Sellersville, and William E. Pfeffer, South Perkasie, Pa., assignors to United States Gauge Company, Sellersville, Pa., a corporation of Pennsylvania Application November 29, 1938, Serial No. 243,044

5 Claims. (Cl. 116—129)

The present invention relates to a novel dial and pointer, or panel structure, and, more particularly, to a novel dial and pointer or panel structure adapted for striking illumination.

Indicating instruments, usually, are mounted on an instrument board in position to be viewed by an operator seated or otherwise stationed in front of the instrument board. It is often difficult from the operator's position to properly read such instruments due to improper lighting of the dial of the instrument. Furthermore, when such instruments are mounted, particularly in the dashboards of automobiles, aeroplanes and the like, where the instrument must be read at night, it has been impossible to adequately illuminate the dial pointers so that a quick glance will enable a reading of the instrument and at the same time eliminate undesired glare.

Under present manufacturing practices, when the panel or dial and pointer structures are sufficiently illuminated, undesirable shadows are cast in the vehicle or the stray light glares in the eyes of the operator so that his view through the windshield is seriously impaired.

It is, accordingly, the primary object of the present invention to provide a novel panel or dial structure, which may be adequately illuminated while preventing undesired distribution of light in the region around and beyond the panel.

A further object of the present invention resides in providing an indicia bearing element, particularly adapted to be illuminated by directing rays of light into the body of the element in such a way that the indicia appear luminous.

A further object of the present invention resides in providing an indicia bearing element or an indicating pointer with a fluted area on an edge surface to diffuse the light rays entering through the edge and means to reflect the rays back and forth within the body of the element to obtain a soft but adequate, illumination of the indicia or the pointer.

Another object of the present invention resides in coating selected portions of a translucent indicia bearing element in such a manner that the indicia may be vividly illuminated without glare.

A further object resides in providing a normally artificially illuminated element with radium treated areas to intensify the artificial illumination of said areas and to serve as a safety factor upon failure of the source of artificial illumination.

Other objects will appear from this description and the appended claims when read in connection with the attached drawings, wherein:

Figure 1 is a front plan view of a dial blank of the present invention;

Figure 2 is a rear plan view of the dial blank of Figure 1 after application of the primary coating.

Figure 3 is a front plan view of a completed dial made in accordance with the present invention.

Figure 4 is a sectional view taken on line 4—4 of Figure 3.

Figure 5 is a top plan view of a pointer made in accordance with the present invention;

Figure 6 is a side elevational view of the pointer of Figure 5.

Figure 7:
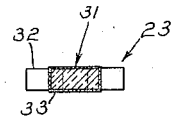
Figure 7 is a sectional view taken on line 7—7 of Figure 5.
Figure 8:
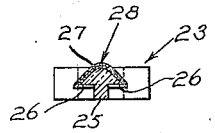
Figure 8 is a sectional view taken on line 8—8 of Figure 5.

With continued reference to the drawings, wherein like reference numerals are employed to designate the same parts through the several figures of the drawings, numeral 10 indicates generally a disk-like dial member illustrating an indicia bearing element manufactured in accordance with the present invention. While a circular dial for an indicating instrument is illustrated, it is to be understood that the member 10 may take any desired form and be applied to any desired use without departing from the scope of the present invention.

Dial 10 is made of a crystal clear or translucent substance, for example, "Plexiglas," which is an acrylic resin or "Lucite" which is a polymerized derivative of methacrylic acid. Either of these materials are available on the open market in sheet form.

A dial 10, or panel of desired configuration, is cut from a sheet of the material and treated as follows:

The surface 11 of dial 10, to be used as the dial-face, is given a matte finish by means of a sand blasting treatment. The dial is then provided with a coating 12 of white paint, except for a portion 13 of the edge, which is adapted to permit passage of light rays into the interior of dial 10 and preferably a portion 14 of the rear face adjacent portion 13 the purpose of which will be hereinafter pointed out. The portion 13 is provided with vertically extending fluting or grooves 15 designed to diffuse the rays of light entering through portion 13, throughout the body of dial 10.

The coating 12 on the face of dial 10 is relatively thin and is printed over with a black paint or like opacent material, to form an opaque coating 17 except in the area of the markings, figures, etc., which are left white. Certain of these white markings and the numerals and letters may then be treated with radium paint 18 in the usual manner. The coating 12 on the coated portion of the edge and the rear surface is relatively heavy to assure the proper functioning of the dial.

An aperture 21 is provided in the center of dial 10 for the passage of the pointer operating spindle and suitable apertures 22 are provided for the passage of suitable securing elements.

The pointer 23 is also preferably constructed of similar translucent material. The indicating portion 24 of pointer 23 is preferably of substantially triangular shape in cross-section with a flat face 25 of the triangle serving as the underside. Face 25 is provided along each longitudinal edge with a series of parallel, transverse flutings or grooves 26 and the upper surface is coated with a thin coat 27 of white paint. A radium paint coating 28 may be disposed over the white paint coating, in whole or in part, after the manner of the markings, etc., of the dial.

Figure 9:
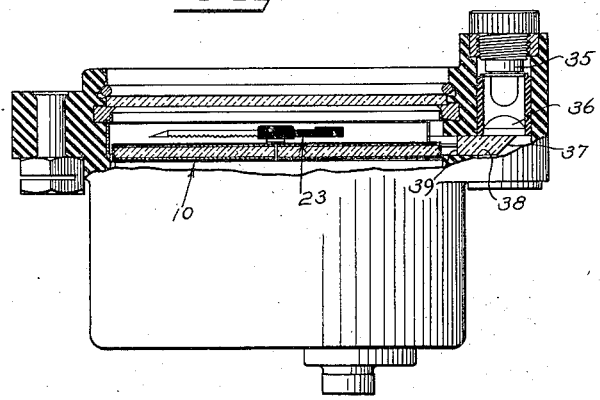
Figure 9 is an assembly view in partial section illustrating a preferred manner of using the dial and pointer of Figures 1–7.

The hub 29, tail 31 and balance weight 32 are preferably provided with a coating 33 of opaque material like that applied to the face of the dial. As a consequence, when the dial and pointer are in assembled relation as in Figure 9, portion 24 will be readily seen against the dark background of dial 10 while tail portion 31, hub 29 and balance weight 32 will blend in with the dial background and be relatively invisible.

The use of such indicia bearing elements and pointers is particularly adapted for a system of lighting such as that described in detail and claimed in the copending application of Maximilian Klein and William E. Pfeffer entitled "Illuminating indicating instruments," Serial No. 243,045, filed November 29, 1938. In this system, rays of light from a bulb 35 pass through a bulls-eye lens 36 to reflecting surface 37 of prism 38 and are projected on the fluted edge portion 13 of dial 10 from exit face 39 of prism 38. The portion 13, being clear, the rays of light enter the interior of the body of dial 10. Due to the vertical fluting 15, the rays enter dial 10 in all directions and are diffused throughout the interior of the dial.

These diffused rays of light pass through dial 10 and strike the exteriorly coated edges of the dial where each ray is partially reflected in a multiplicity of directions due to the concave, partial reflecting surface provided by the coated edges of the dial. As a consequence, the dial body glows causing unusually sharp illumination of the white markings and figures due to the absorption of light by the white coating. The white coating on the edge, rear surface and face of dial 10 further assures the glowing of the dial body, since this portion of the coating absorbs a portion of the light rays and in effect, produces a multiplicity of additional light sources for lighting the markings.

The illumination of the primary markings and figures on the face of the dial is further enhanced due to the fact that radium coating 18 absorbs still further rays of light and due to the inherent characteristics of the radium material in adding further light energy to these markings and figures.

The black coating 17 furnishes an opaque, dark background, causing the markings and figures to stand out in sharp contrast. As a consequence, the dial markings are brightly illuminated, while undesired glare is eliminated due to the indirect nature of the light rays.

Since the rays of light enter dial 10 at 13, the area immediately adjacent thereto normally would receive more light and the numerals in this area would be somewhat brighter and diminish the desired even appearance of the dial. Accordingly, area 14 on the rear of dial 10 may be left free of white paint so that the face coating of white over the corresponding area is lighted by absorption of the direct light from the light source and is not augmented by reflected light from the rear surface.

Other rays of light are directed across the face of dial 10. These rays strike pointer 23 and are absorbed by the surface coating while others strike the fluting 26 and are diffused throughout the body of the pointer in much the same manner as in the dial.

The radium coating on the dial markings and pointer also serves as an emergency or safety element, should the artificial source of light fail while in service. In this connection, the radium, as is well known, will glow in the dark so that the instrument is readable although not so readily as when the normal source of illumination is operating.

While the illumination on member 10 is very good if the entire rear face of member 10 is provided with the white coating 12, it has been found that the portion of member 10 adjacent the fluted portion 13 is somewhat brighter causing uneven illumination of the markings. It is to eliminate this so-called bright spot that portion 14 is left free of the coating material. It would appear that the elimination of coating 12 over this area permits a portion of the light rays to pass rearwardly through portion 14 into the casing and the lighting of the markings in this area occurs solely due to the absorption of the more intense entering rays by the thin white coating of the dial face immediately overlying the portion 14. The provision of this clear portion 14, accordingly, enables the uniform lighting of the markings over the entire dial.

Figure 10:
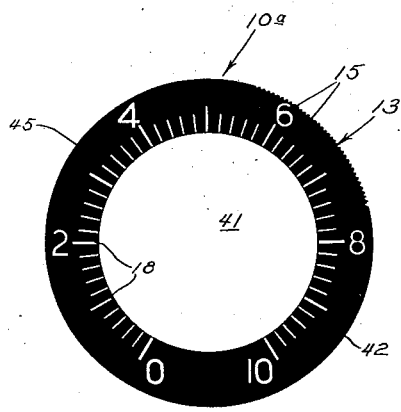
Figure 10 is a plan view of a modified form of the present invention.
Figure 11:
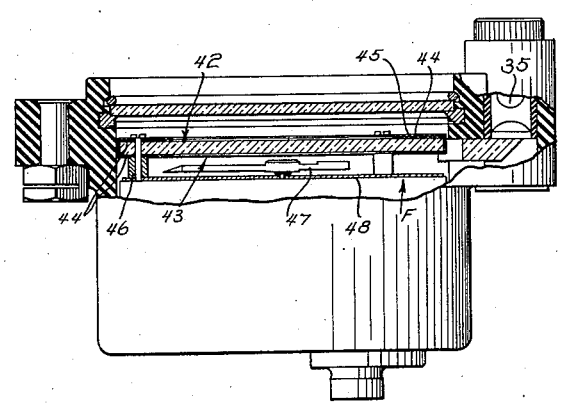
Figure 11 is an assembly view showing a preferred way of using the dial of Figure 10.

A modification of the present invention is disclosed in Figures 10 and 11. In this form of the invention, the same reference numerals will be used to indicate the same parts and a detailed description thereof will be omitted.

The dial 10a of this form of the invention is made up with a perfectly clear central portion 41 and with a clear fluted edge portion 13. The margin of dial face 42 is sandblasted as heretofore described and the edge of dial 10, except portion 13, and the marginal portions of front face 42 and rear surface 43 are provided with a coating 44 of white paint. The marginal coating on face 42 is relatively light as compared to that on the edge and rear surface. The coated margin 44 of face 42 is printed over with opacent material, in the manner heretofore described, to provide an opaque coating 45 leaving the markings and figures white. Certain of these markings and the figures may then be coated with radium as at 18, in the manner heretofore described.

Dial 10a, constructed as pointed out above, may be mounted on spacers 46 (Figure 11) and carried by the framework "F" of an indicating instrument. The light rays from a suitable source of illumination such as bulb 35 are passed through fluted edge portion 13. The fluting 15 causes the light rays to pass through the body of the dial, as heretofore pointed out, and the markings in the margin of the dial face glow, as pointed out in connection with the dial of Figures 1 to 9. The central portion 41 appears as a lighted field through which a metallic pointer 47 mounted in front of a dark faced disk 48 carried by framework F is viewed.

A portion of the light rays pass across the rear surface of dial 10, illuminating the area between an opaque disk 48 and dial 10 and augments the light from portion 41 of the dial. As a consequence, the pointer 47 and any desired name plate or the like (not shown) on disk 48, may be read with facility. If desired, a reflector may encircle the area between dial 10a and disk 48 to further enhance the illumination of pointer 47 and disk 48.

While the present invention has been described in connection with dials over which pointers move, it is capable of use in connection with illuminated panels or other indicia bearing elements, such as radio panels or like, in which no movable pointer is used, the illumination of such panels, which frequently include several sets of indicia, having been found to be highly satisfactory, the indicia standing out vividly on a dark ground.

It will be understood that no shadows are cast to obscure the reading of the indicia of dials or panels, constructed in accordance with the present invention and used as herein disclosed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A non-glaring, edge illuminable indicia-bearing element, comprising a body of translucent material, a light transmitting coating applied over one side of said body and an opaque coating applied over said first-named coating except at portions thereof, the interruptions of said opaque coating providing indicia, and means to minimize glare at the interruptions adjacent the source of edge illumination, comprising means to reflect and disperse light into the more remote interruptions.

2. A non-glaring, illuminable indicia-bearing element, comprising a body of translucent material having a coating of translucent, white paint covering the front and back face except for a small portion of an edge and a small area of the back face adjacent said uncoated edge portion and an opaque coating applied to the front face of said body over said first-named coating, said opaque coating being interrupted at predetermined points to provide indicia.

3. A dial and pointer combination, consisting of a dial having a body of translucent material coated on its front face with an opaque material interrupted at predetermined points to provide indicia and having a light transmitting coating applied to its rear face, and a pointer comprising an indicating portion, hub and counterweight portion movable over said dial and having a light transmitting coating applied to the indicating portion and an opaque coating applied to the hub and counterweight portion, said dial and pointer cooperating to provide a dial and pointer assembly wherein the indicia on the dial and the indicating portion of the pointer only are adapted for illumination.

4. A pointer for an illuminated dial, comprising a body of translucent material having a hub portion, an indicating portion and a counterweight portion, a translucent white coating on said indicating portion, and an opaque coating on said hub portion and said counterweight portion, said coatings cooperating to adapt the indicating portion only for illumination.

5. A non-glaring edge illuminable indicia-bearing element comprising a smooth surfaced, substantially planar light transmitting body forming a dial, a smooth unbroken coating of light colored translucent material on said surface, an opaque coating of contrasting color over said translucent coating, said opaque coating being provided with discontinuities which expose portions of said translucent coating to provide indicia on said dial, and means on an edge portion of said dial for dispersing throughout the body of the dial the light rays entering that edge portion.

MAXIMILIAN KLEIN.
WILLIAM E. PFEFFER.